United States Patent
Ghisler

[19]

[11] Patent Number: 5,950,128
[45] Date of Patent: Sep. 7, 1999

[54] METHOD AND APPARATUS FOR INCREASING THE ANSWERING PROBABILITY OF CALLS TO MOBILE RADIO TERMINALS

[75] Inventor: Walter Ghisler, Väsby, Sweden

[73] Assignee: Telefonaktiebolaget LM Ericsson, Stockholm, Sweden

[21] Appl. No.: 08/708,113

[22] Filed: Sep. 4, 1996

Related U.S. Application Data

[62] Division of application No. 08/476,041, Jun. 7, 1995, Pat. No. 5,541,976, which is a division of application No. 08/159,116, Nov. 30, 1993, abandoned, which is a division of application No. 07/686,600, Apr. 17, 1991, abandoned.

[51] Int. Cl.⁶ ............................................ H04Q 7/24
[52] U.S. Cl. ..................... 455/426; 455/432; 455/458; 455/556
[58] Field of Search ................................. 455/426, 459, 455/432, 433, 461, 445, 38.4, 458, 556; 340/825.44

[56] References Cited

U.S. PATENT DOCUMENTS

| | | |
|---|---|---|
| 5,402,467 | 3/1995 | Watanabe ................................. 455/458 |
| 5,414,750 | 5/1995 | Bhagat et al. . |
| 5,541,976 | 7/1996 | Ghisler . |

FOREIGN PATENT DOCUMENTS

| | | |
|---|---|---|
| 503 813 | 9/1992 | European Pat. Off. . |
| 60-46626 | 3/1985 | Japan . |
| 2 201 866 | 9/1988 | United Kingdom . |
| 2 230 162 | 10/1990 | United Kingdom . |
| 2 255 847 | 11/1992 | United Kingdom . |

*Primary Examiner*—Wellington Chin
*Assistant Examiner*—Lee Nguyen
*Attorney, Agent, or Firm*—Burns, Doane, Swecker & Mathis, L.L.P.

[57] ABSTRACT

A radio communication system is disclosed comprising a Public Land Mobile Network (PLMN) where mobile radio telephones communicate with at least one mobile services switching center via corresponding base stations and where a home location register is connected to the at least one mobile services switching center. A wide area paging system sends out paging signals from at least one paging system accessible to the at least one mobile services switching center. A plurality of mobile radio telephones register their whereabouts in the home location register each time they are switched on. A plurality of pagers are associated with but physically separate from the mobile telephones. The paging system is accessed by the mobile services switching center for performing a page to a called subscriber when the called subscriber's mobile radio telephone is in an off state or cannot be reached for other reasons. An incoming call to the mobile telephone is parked until the mobile telephone is switched on and registered with the home location register and the mobile services switching center parking the incoming call is informed of the active state of the mobile telephone and is provided with a roaming number. The mobile services switching center then calls the activated mobile telephone using a page over the cellular network and the mobile telephone answers the incoming call. If the mobile telephone is not switched on and does not register within a specified time after parking the incoming call, a time out will occur and disconnect the parked incoming call.

37 Claims, 4 Drawing Sheets

METHOD AND APPARATUS FOR INCREASING THE ANSWERING PROBABILITY OF CALLS TO MOBILE RADIO TERMINALS

The present invention is herewith submitted as a Division, claiming priority to U.S. application Ser. No. 08/476,041, filed on Jun. 7, 1995, which issued as U.S. Pat. No. 5,541,976 on Jul. 30, 1996; which was a Rule 62 File Wrapper Division Application of U.S. application Ser. No. 08/159,116, filed on Nov. 30, 1993 (Abandoned); which was a Rule 62 File Wrapper Division Application of U.S. application Ser. No. 7/686,600, filed on Apr. 17, 1991 (Abandoned).

FIELD OF THE INVENTION

The present invention is related to cellular telephone and paging systems, and more particularly the present invention is directed to a mobile cellular telephone system that incorporates independent paging capabilities.

BACKGROUND OF THE INVENTION

Radio paging systems are well known and widely used. Upon receipt of a page, conventional radio paging systems provide a user with audio and/or visual information from the paging party, but cannot transmit information back to the paging party. Recently, national and international paging services have been implemented so that individuals may receive a page throughout the United States or throughout Europe. Despite the advances in paging technology, a significant disadvantage of radio paging is that after an individual carrying a pager has learned that a paging party wishes to communicate, that individual must locate a telephone communication system to contact the paging party and pay for this contact.

Radio paging systems typically include a radio transmitter for transmitting a coded radio frequency signal associated with a party to be paged and a portable paging receiver. To contact a party carrying a pager, a person dials a telephone number. The number is transferred by the public switched telephone network (PSTN) to the radio transmitter. The transmitter transmits a page signal coded to all pagers in the range of the transmitter. Because each mobile pager responds to a different paging code, only the pager having a code corresponding to that transmitted is activated. The activated pager generates an audible tone or some other signal to notify the designated party that he or she has been paged. That party typically responds by calling a specific telephone number to receive further instructions.

One advantage of paging systems is that they can serve relatively large geographic areas. Another advantage is that a paging subscriber may be reached anywhere in the transmitter coverage area without the paging system knowing the location of that subscriber. As described above, the major disadvantage of paging systems is that a subscriber cannot immediately communicate with the person who initiated the call. In fact, in conventional paging systems, the subscriber cannot even acknowledge that he or she has received the page. Also, calling back later entails cost.

In contrast, mobile radio telephone systems allow flexible two way radio communications with a plurality of mobile subscribers. Cellular telephones allow subscribers to be paged immediately over cellular radio paging frequencies (as long as the phone unit is on). The mobile telephone responds immediately to a page and gets a voice channel assigned for the communication. In addition, cellular subscribers may of course initiate calls themselves. Unfortunately, mobile telephones cannot be paged while the mobile telephone is turned off or deactivated. Also, mobile telephones are heavier than pagers and a cellular page may not be heard by the subscriber if he/she has left the mobile telephone in an on-state in the vicinity but out of hearing distance.

One disadvantage with cellular telephoning is that a subscriber's location must be known to the cellular system. Subscriber location is known by registering each mobile, e.g. periodically. In contrast, conventional paging systems do not require individual pagers to register. Thus, paging services are advantageous in situations where a subscriber desires to keep his exact location secret but still wants to have the option of being contacted.

Recently, it has become possible to subscribe to a cellular service and to an independent paging system. Telephone calls from the land based telephone network are attempted initially with the mobile station over the cellular network. If the subscriber does not answer, the call is diverted to an FM radio paging system. A cellular pager is disclosed in U.S. Statutory Invention Registration H 610 to Focarile et al. In this system, a separate paging system is used in conjunction with the cellular telephone system. The paging system provides a backup for cellular telephone calls intended for an associated cellular telephone which has been deactivated because the subscriber is, for example, temporarily away from his automobile. Since the pager is assigned the same number as the telephone, the pager provides an alert signal to the subscriber of the cellular telephone indicating that a call has been attempted to the subscriber's telephone. Later, the subscriber may call an appropriate service number at his/her own expense for the information about the earlier call when the subscriber returns to the automobile and activates the cellular telephone.

UK Patent No. 2 230 162 to Rodriguez physically combines a pager and a hand held cellular mobile radio terminal whereby the pager is connected to the hand held cellular mobile radio terminal in order to be able to keep the hand held terminal in a switched off mode to save battery power, but still be accessible for incoming calls. When a call is being directed toward the handheld terminal, the pager is first paged which then automatically switches on the handheld terminal so that the handheld terminal can receive the call which is redirected to the mobile terminal. However, the method taught by Rodriguez needs a specially modified handheld terminal and pager. It would be desirable to use standard handheld terminals and pagers to achieve the same battery savings as in Rodriguez although battery savings is not such an important problem anymore due to recent technical progress in this field. Furthermore, it is desirable to give a subscriber carrying a pager in the on-state and a cellular telephone in the off-state a chance to screen incoming calls and to decide whether to answer a call rather than having the pager automatically switching the cellular telephone on. Furthermore, it is desirable for a subscriber receiving a call to have a pager and a handheld terminal which are physically separate in order to allow the user to carry only the pager while having the heavier handheld somewhere in the vicinity and still enable answering of a call.

SUMMARY OF THE INVENTION

It is an object of the present invention to overcome the deficiencies cited above by providing a radio communication system in which higher probability of cellular calls being answered can be achieved using standard hand held terminals and standard pagers. It is a further object of the present invention to relieve a called subscriber from the need to carry a handheld terminal for receiving an alert signal and instead allowing him/her to merely have the handheld terminal in the vicinity within fetching distance rather than "alert-hearing" distance for answering incoming calls.

According to one embodiment of the present invention, a radio communication system is disclosed comprising a Public Land Mobile Network (PLMN) where mobile radio telephones communicate with at least one mobile services switching center via corresponding base stations and where a home location register is connected to said at least one mobile services switching center. A wide area paging system sends out paging signals from at least one paging system accessible to the at least one mobile services switching center. A plurality of mobile radio telephones register their whereabouts in the home location register each time they are switched on. A plurality of pagers are associated with but physically separate from the mobile telephones. The paging system is accessed by the mobile services switching center for performing a page to a called subscriber when the called subscriber's mobile radio telephone is in an off state or cannot be reached for other reasons. An incoming call to the mobile telephone is parked until the mobile telephone is switched on and registered with the home location register and the mobile services switching center parking the incoming call is informed of the active state of the mobile telephone and is provided with a roaming number. The mobile services switching center then calls the activated mobile telephone using a page over the cellular network and the mobile telephone answers the incoming call. If the mobile telephone is not switched on and does not register within a specified time after parking the incoming call, a time out will occur and disconnect the parked incoming call.

According to a further embodiment of the present invention in the radio communication system described above, the connection problem which occurs when the called mobile radio terminal is in a switched on state but the called subscriber does not hear the alert signal of a terminating call is solved. Also in this case, the wide area paging system is accessed by the mobile services switching center for performing a wide area page to the called subscriber while the alert signals continue on the subscriber's cellular terminal. In other words, alerting is performed simultaneously on the pager terminal and the cellular terminal. The incoming call is parked until the mobile telephone terminal answers the incoming call or until a predetermined time has elapsed after the initiation of the wide area page.

The present invention may be summarized as an apparatus and a method for connecting a call from a first user with a first terminal to a second user with a second terminal of a cellular radio type in a communication system containing a cellular communication system and a wide area paging system, wherein a wide area pager terminal is carried by the second user and whereby the wide area pager terminal is associated with but separate from the second terminal, the method comprising the steps of: originating a call from said first terminal to said second terminal; parking the call at a mobile services switching center in the cellular communication system; attempting to cause a cellular page to the called subscriber via said cellular communication system; determining whether the step of attempting resulted in a time out due to a lack of response within a predetermined period of time; causing a page to the pager terminal of the second user via the wide area paging system when the answer to the step of determining is positive; receiving of an alert signal by the second user on any of his/her terminals; answering of the call by the second user depressing at least one key on said second terminal including a key with off-hook function within a time out limit from the time of parking; and disconnecting the call if a time out limit is reached before the step of answering.

BRIEF DESCRIPTION OF THE DRAWINGS

The present invention will now be described in more detail with reference to preferred embodiments of the invention given only by way of example, and illustrated in the accompanying drawings, in which.

DETAILED DESCRIPTION

Figure 1:
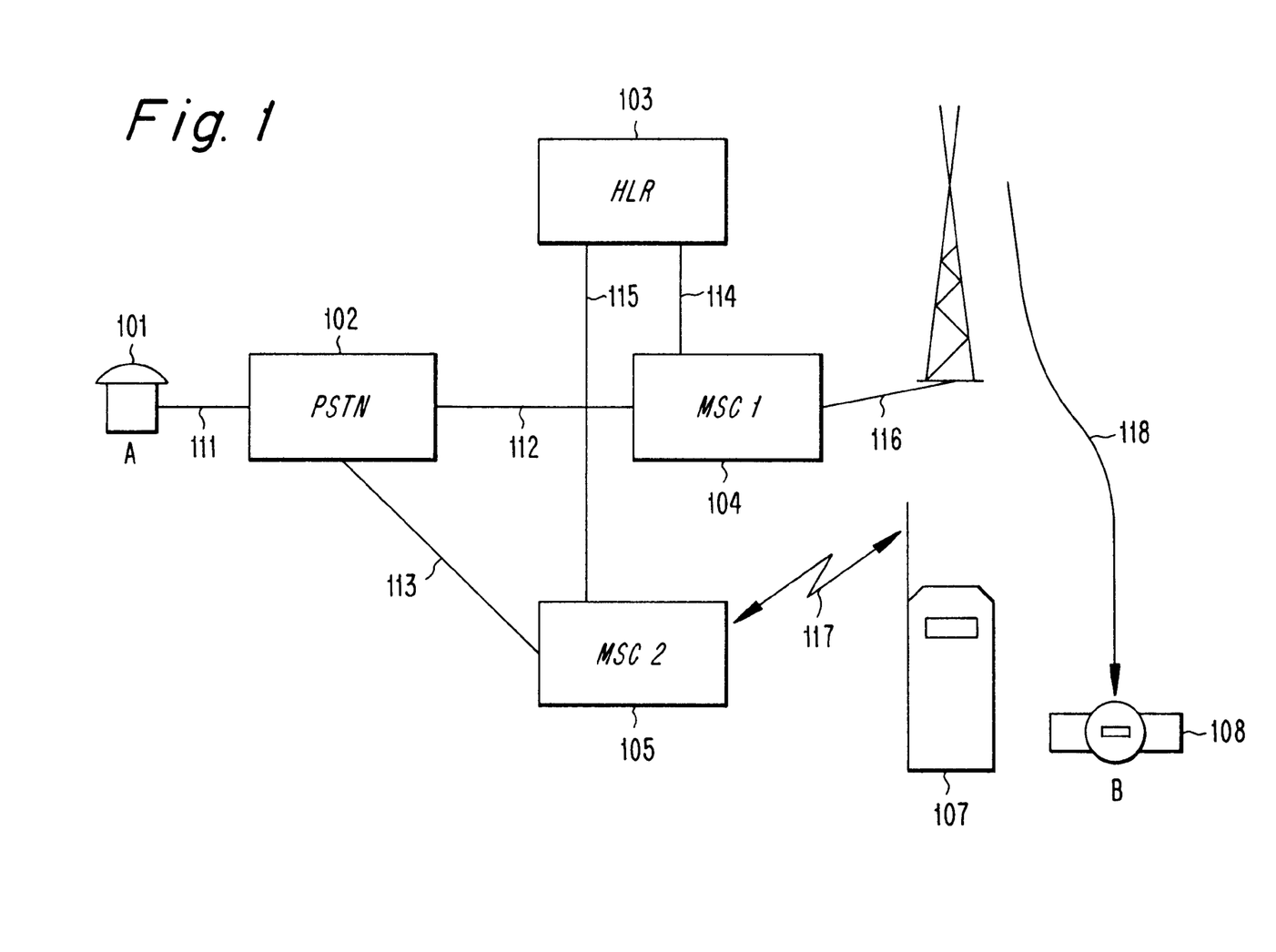
FIG. 1 illustrates a block diagram of a radio communication system according to one embodiment of the present invention.

FIG. 1 illustrates a radio communication system according to one embodiment of the present invention. A calling subscriber "A" has a plain old telephone (POT) 101 connected via a connection 111 to the Public Switched Telephone Network (PSTN) 102 which in turn connects via trunks 112 and 113 to the Mobile Services Switching Centers MSC 1 and MSC 2, respectively. The MSC 1 is the MSC closest to the calling subscriber "A" and it is the so-called anchor MSC responsible for a call outgoing from the terminal A. The MSC 2 is the MSC closest to the called subscriber who has a cellular mobile radio terminal 107 and a wide area pager 108. The wide area paging system is represented in FIG. 1 by the antenna mast 106 and the pager 108 is in the radio coverage area of the paging system 106. The called subscriber's terminals are accessible to the paging system 106 via a downlink paging signal 118 and connectable to the cellular radio system via radio signals 117 whereby the MSC 2 has a base station (not illustrated) for this radio contact. The two radio terminals 107 and 108 do not communicate with each other.

According to one embodiment of the present invention, an alerting technique can be provided making use of the standard handheld terminals and pagers to alert a user that a call is incoming and to connect the incoming call wherein there is no communication between the pager and the handheld terminal. In this embodiment, the "B" subscriber's handheld terminal is in the off state while the associated pager is in the on state. The calling subscriber "A" dials the number of the handheld terminal of the subscriber "B" and is connected to the mobile services switching center 104 nearest to the calling subscriber "A". The MSC 104 then asks the home location register HLR 103 associated with the dialed number for a roaming number of the "B" subscriber. The HLR in return sends back information that the handheld terminal "B" is off or cannot be contacted and also includes a "C" number to which the incoming call should be diverted, wherein the "C" number is the number of an associated physically independent wide area pager carried by subscriber "B". In addition, the HLR 103 sends to the MSC 104 together with the "C" number a special indication or code, e.g., a category K, assigned to the "B" subscriber and stored in the HLR in order to inform the MSC that the "B"

subscriber is of a novel type having both a handheld terminal and an associated pager and requiring the execution of the inventive call setup procedure described below. The MSC 104 tells the subscriber "A" to wait using a prestored voice message which indicates that a page is being performed. The MSC 104 then calls the wide area paging system using the "C" number received from the HLR and sends a message asking the wide area paging system to perform a page. In addition, the message may include the telephone number of the calling subscriber "A" with an indication (e.g., the character *) to the subscriber "B" that the page regards a parked incoming call that may be answered within a predetermined time. The wide area paging system sends out a paging message to the pager alerting the subscriber "B" and the message also contains the telephone number of the subscriber "A". When the subscriber "B" receives the page, the subscriber "B" will be able to read the telephone number of the subscriber "A" on the display screen of the pager so as to determine whether he/she wants to answer the call. If the subscriber "B" decides to answer the call, the "B" subscriber pushes the "power on" key of the hand held terminal which turns on the handheld terminal. This action causes the hand held terminal to register its location with the home location register using a known procedure. The mobile services switching center 104 asks the home location register at periodic intervals, e.g., 5 seconds, for a roaming number to the handheld terminal until the answer changes from the "cannot be contacted" state to a roaming number "X" or until a timeout timer in MSC 104 has elapsed. For example, the timeout timer could be set for 30 seconds after initiating the page. If a roaming number "X" is received before the expiration of the timeout timer, the MSC 104 calls the handheld terminal setting up communication between the subscribers "A" and "B" in the usual way.

Alternatively, instead of the MSC 104 periodically asking the home location register for a roaming number, the home location register could contact the MSC when the mobile radio terminal has been switched on and has registered with the HLR. In this embodiment, the home location register stores the request for the roaming number along with other information such as the identity of the requesting MSC and the identity of the called subscriber B. When called subscriber B activates his/her terminal, the home location register checks to see if a request for a roaming number for B has been stored, and if a request has been stored, the home location register contacts the requesting MSC and gives the MSC a roaming number.

According to another embodiment of the present invention, the probability of terminating calls being successful can be increased by making use of the standard handheld terminals and pagers to alert a user on both terminals (telephone and pager) simultaneously. In this embodiment, the "B" subscriber's handheld terminal and separate pagers are both in an on state but the handheld terminal although being in the vicinity of the "B" subscriber is not heard by him/her. The calling subscriber "A" dials the number of the handheld terminal of the subscriber "B" and is connected to the mobile services switching center 104 nearest to the calling subscriber "A." The MSC 104 then asks the HLR 103 associated with the dialed number for a roaming number of the "B" subscriber. The HLR in return sends back the requested roaming number together with the special category K of the "B" subscriber and a "C" number for alerting the wide area pager carried by the B subscriber if indicated. The MSC 104 sets up the call to the cellular terminal and starts a time measurement. If there is no answer within a predetermined time, e.g., corresponding to a time setting of between zero to three alert signals (rings), the MSC 104 tells the subscriber "A" to wait using a prestored voice message which indicates that a wide area page is being performed. The MSC 104 then calls the wide area paging system using the "C" number received from the HLR 103 and sends a message asking the wide area paging system to perform a page. When the subscriber "B" receives the page he/she will realize that he/she has not heard the cellular alert signal. The "B" subscriber may then proceed to answer the call on the handheld terminal. A difference between this embodiment and the previously described embodiment is that when the handheld terminal is in an on state the call may be answered directly by pushing the off-hook key whereas if the handheld terminal is in an off state, its on/off key has to be pushed first and its off-hook key afterwards.

In the prior art, it is known that after switching on a mobile radio terminal, the subscriber is asked to enter his/her personal identification number (PIN) in order to prevent someone from stealing the radio terminal and then using it for calls at the expense of the owner. In addition, it is the intention to prevent someone from using a stolen terminal to receive calls. A problem arises for the preferred embodiment in that when the subscriber "B" switches on his/her handheld terminal in order to register and then receive the parked incoming call, the time available is limited because of the use of the timeout timer. Therefore, it is desirable to modify the described authentication procedure. One such solution is described below.

The PIN number may be entered when switching the handheld terminal off rather than when switching the handheld terminal on. When the power off button on the handheld terminal is pushed, this order is not carried out immediately. Instead of immediately turning off, the subscriber can be asked to enter the PIN number. After doing this, the off key may be pushed again causing power off. The effect of such an authentication, if successful, would be that the next time the mobile radio terminal is switched on, the authentication process is not required. Instead, registration in the home location register takes place immediately, thus speeding up the process for receiving a parked call. It is an advantage if the cellular network for which the present invention is implemented has the function of informing the HLR when a mobile radio terminal performs power off. However, it can never be avoided that a mobile moves into a radio shadow or gets outside the radio coverage of the system and will therefore not be contactable although nothing has been reported. In this case, the cellular system will try to set up the requested connection to the addressed "B" mobile terminal and after a time out report that the subscriber cannot be reached which is handled according to the present invention as if the terminal was switched off.

It should be noted, however, that the problem of not knowing that a terminal is in an off-state is limited in time to the period of so called periodic registration. In known cellular systems there is periodic registration e.g. every 15 minutes, in order to know that a terminal is off when no registration has been received for a time exceeding the period.

Figure 2A:
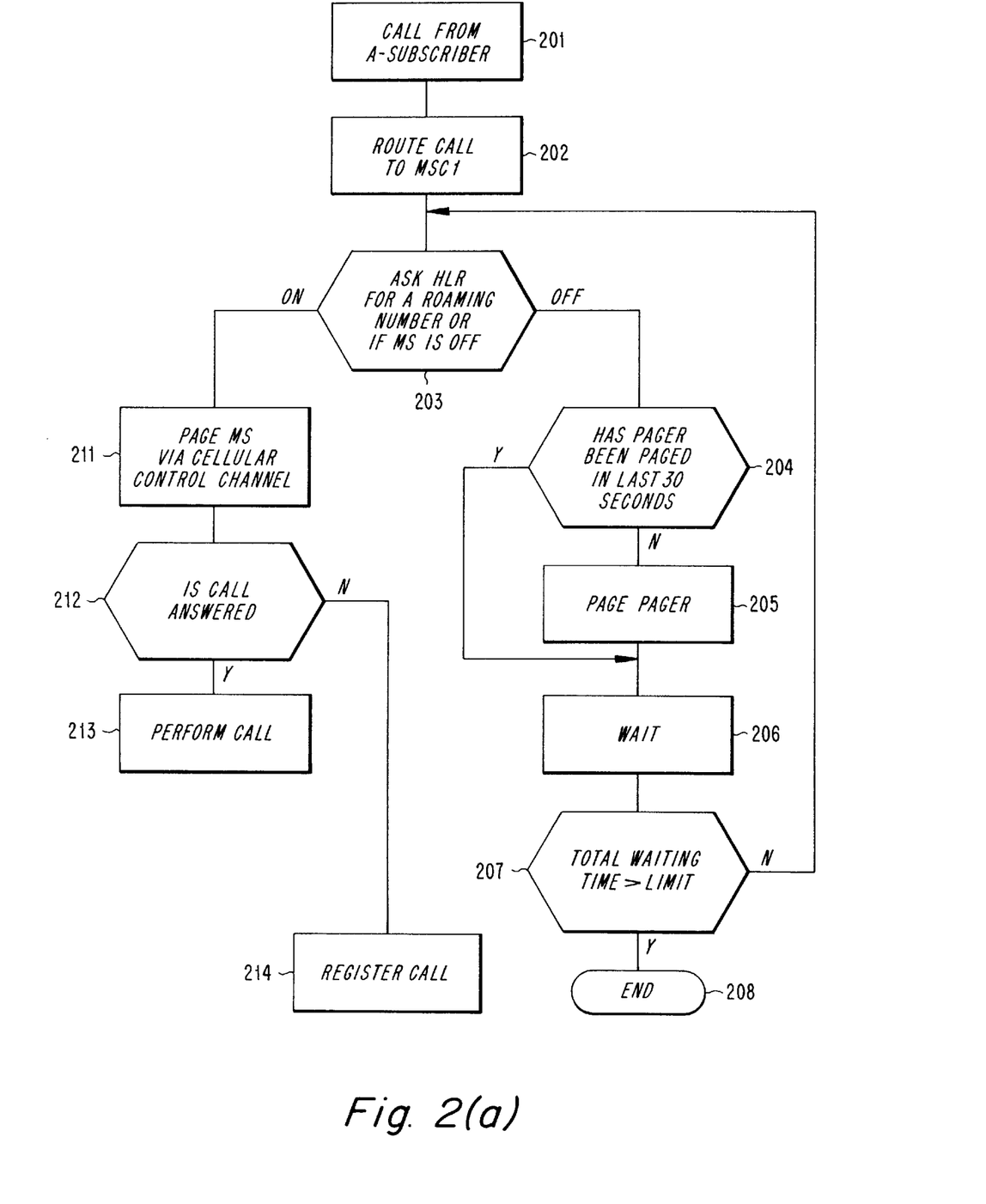
FIGS. 2a–2b illustrate flow charts according to several embodiments of the present invention.

The preferred embodiment of the present invention will now be described with reference to FIGS. 1 and 2*a*. When a call is originated by the subscriber "A" in step 201, the call is routed, in step 202, to the nearest MSC, in this case, MSC 1 since the "B" number specified belongs to a mobile terminal series of numbers. The MSC 1 asks, in step 203, the home location register for a roaming number for the handheld terminal 107. The home location register answers that the specified handheld terminal is of category K and that the number of the associated wide area pager is "C" in case it becomes necessary to initiate a wide area page. In addition, if the handheld terminal is switched off or is not contactable, the home location register informs the MSC that the handheld terminal is off and the flow continues in step 204. If the handheld terminal 107 is on, the flow continues at step 211 by directly paging the handheld terminal MS via a cellular control channel associated with the MSC 2 whereby the roaming number received by MSC 1 via link 114 from the HLR allows, in a known manner, the call to be routed from the MSC 1 to the MSC 2 via trunk lines 112 and 113 and the PSTN 102. In steps 212, 213, and 214, depending upon whether the paged terminal 107 answers or not, the call is performed or only registered for later reference. On the other hand, if the handheld telephone 107 is off or is not contactable, this fact is known by the HLR and given to the MSC 1 via connection 114 in step 203. The MSC 1 calls the wide area paging system 106 and transmits the number of the pager asking that a wide area page be performed. The wide area paging system performs the page using a signal 118 and alerts, in step 205, the called subscriber giving him/her the opportunity to manually switch on the handheld terminal 107 in order to prepare to receive the incoming call. Step 205 is preceded by step 204 that checks whether a wide area page has already been performed during the last 30 seconds in which case no new page is sent. After waiting for a period of time, typically 5 seconds, in step 206, the total wait time is checked in step 207. If a certain time limit, for example 30 seconds, is exceeded, the call from terminal A is given a busy tone by MSC 1 and the procedure ends in step 208. If the total waiting time has not yet been exceeded, the flow returns to step 203 to check if the handheld terminal 107 has been switched on and thus registered in the home location register. If the handheld terminal 107 has been switched on, the flow then continues to step 211 which has been described earlier and which may lead to the establishing of a connection between the calling and called subscriber.

It is possible to transmit the telephone number of the calling subscriber from the PSTN via connections 112, 116, and 118 to the pager 108 passing through MSC 1 and the paging system 106, thus informing the called subscriber of the caller's telephone number so that the subscriber may determine whether or not he/she want to accept the call.

An alternative to the loop of steps 204–207 is to have the HLR check autonomously when a registration of the handheld terminal 107 takes place and when this happens initiate signaling to the MSC 1 via link 114 where the incoming call is parked.

Figure 2B:
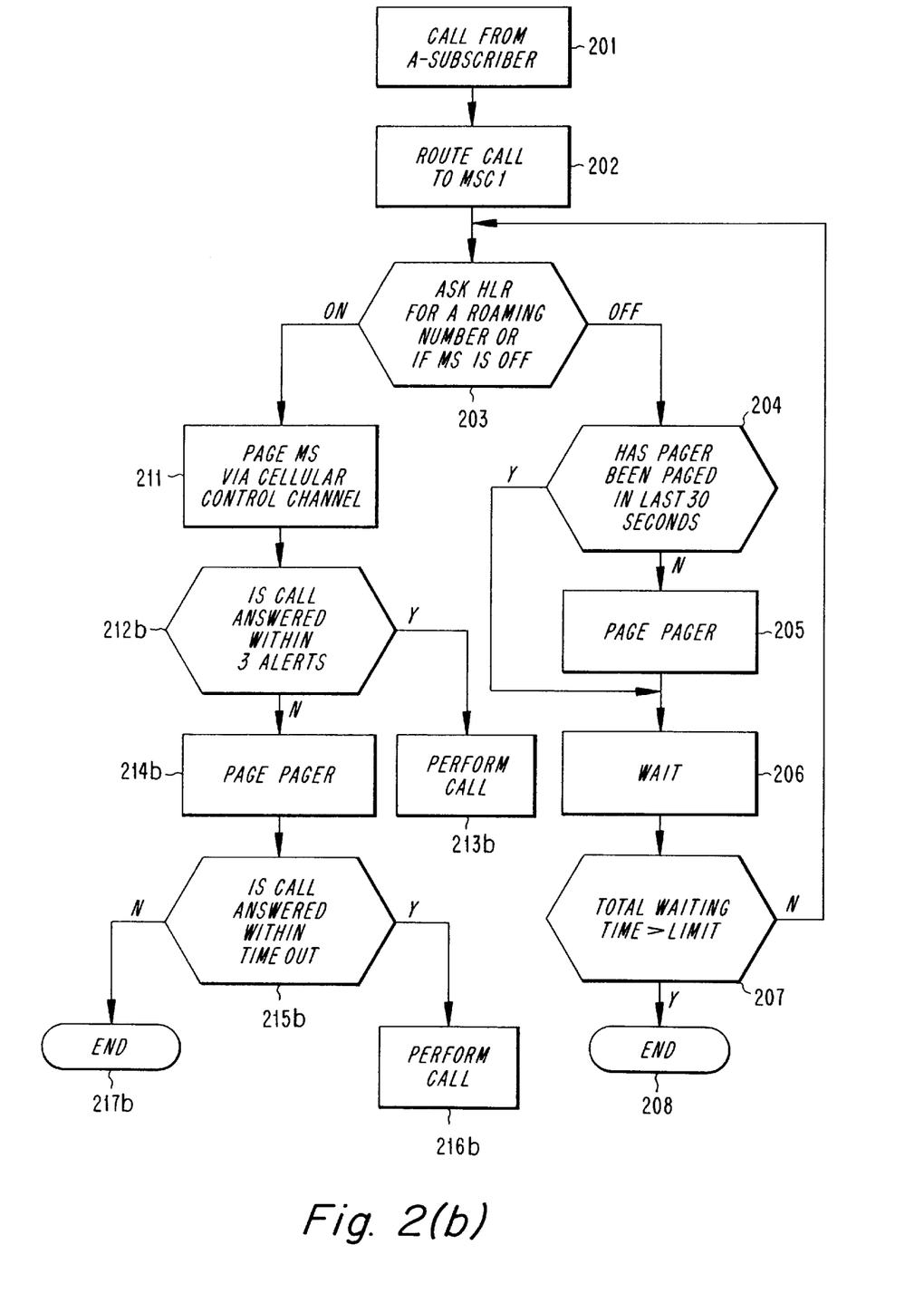

A slightly different embodiment of the present invention will now be described with reference to FIGS. 1 and 2b. The flow of this embodiment is identical to the one illustrated in FIG. 2a except for steps 212–214 being replaced by the steps 212b–217b. This modification takes care of the case when a called subscriber fails to hear, in step 212b, the first three alert signals on his/her handheld terminal whereby the flow continues to step 214b rather than performing the call in step 213b. In step 214b, the MSC calls the wide area paging system 106 as in step 205 and a wide area page is performed calling terminal 108. This may result in the called subscriber answering the call on the handheld terminal in step 216b or otherwise the incoming call will be disconnected in step 217b if the call is not answered within the prescribed period of time.

Figure 3:
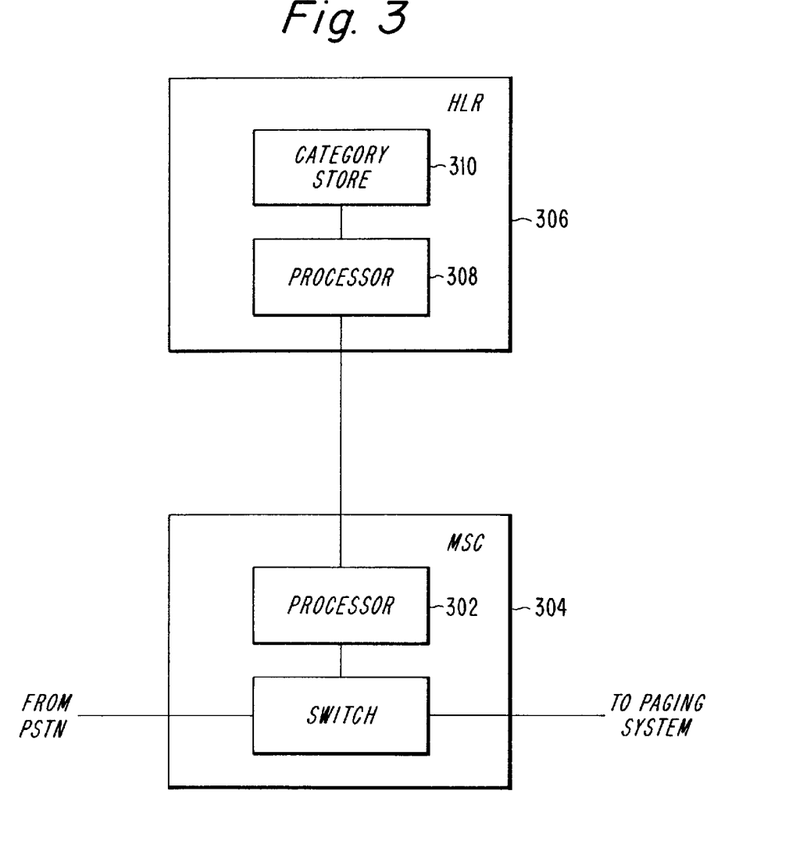
FIG. 3 illustrates an implementation of one embodiment of the present invention.

FIG. 3 illustrates a possible implementation of the present invention. The procedure described above with regard to FIGS. 2a–2b is implemented in programs located in a processor 302 in the MSC 304. The home location register 306 has a processor 308 with access to a category store 310 which has a new type of category (K) for subscribers with the cellular terminal and pager combination which allows a user to answer a call directly within, for example, 30 seconds after the reception of a wide area page. When the MSC 304 requests a roaming number for a specified called subscriber "B", the HLR 306 returns the mentioned special category (K) to the MSC 304 in order to initiate the special program in the MSC 304 for handling this case, i.e., paging, waiting, etc.

Figure 4:
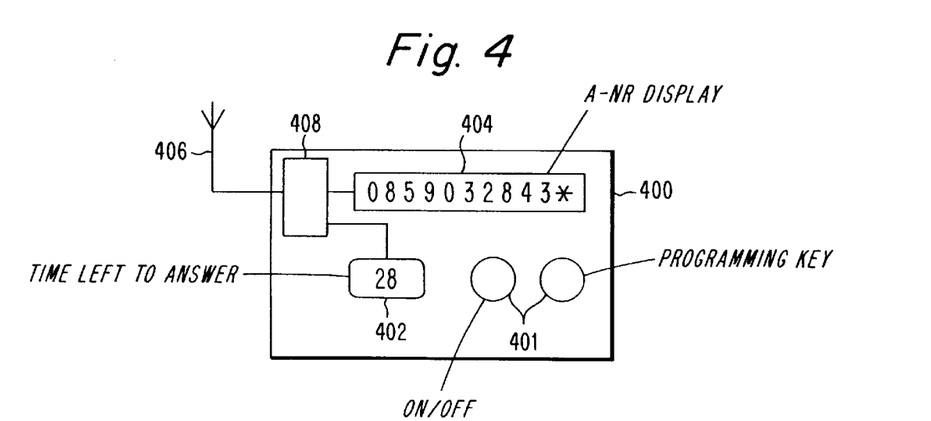
FIG. 4 illustrates a pager according to one embodiment of the present invention.

FIG. 4 illustrates a pager 400 with on/off and programming keys 401 and a special display window 402 which is useful when using the pager together with a cellular terminal according to the invention. The special display window 402 shows the time remaining on the time-out timer. The count down displayed on the pager may be started in the pager by setting the counter to 30 seconds when the page arrives. The A-nr is displayed in window 404 and a star (*) at the end of the A-nr indicates this countdown condition. Alternatively, the count, i.e., the time-out period, can be sent to the pager by the paging system. The pager has an antenna 406 and a control and memory 408 including the function to receive and store telephone numbers of calling parties.

The pager 400 stores the A-numbers of calling subscribers as known in the art, in order to allow the called subscriber to remember who has been calling and for enabling him/her to call back at a later time. This function is still available when using the present invention. However, the present invention provides an addition described below which is motivated by the described direct answering feature of the invention. The addition consists in providing a cancellation message from MSC1 104 to the pager 108 via connections 116, 118 and paging system 106 informing the pager that an incoming call from a specified A-subscriber has been answered by the handheld terminal and then the field in the memory of the pager where calls are registered, the information regarding the call concerned is provided with an indication such as a flag that this call has been answered. This avoids later doubts on the part of the subscriber whether a call has been answered or not.

It will be appreciated by those ordinarily skilled in the art that the present invention can be embodied in other specific forms without departing from the spirit or central character thereof. The presently disclosed embodiments are therefore considered in all respects to be illustrative and not restrictive. The scope of the invention is indicated by the appended claims rather than the foregoing description, and all changes which come within the meaning and range of equivalence thereof are intended to be embraced therein.

What is claimed is:

1. A radio communication system, comprising:

a public land mobile network where mobile radio terminals communicate with at least one mobile services switching center via corresponding base stations and where a home location register is connected to said at least one mobile services switching center;

a wide area paging system for sending out paging signals wherein said paging system is accessible by said at least one mobile services switching center;

a plurality of mobile radio terminals which register their whereabouts in the home location register when they are switched on;

a plurality of pagers each associated with but separate from a particular one of said plurality of mobile radio terminals;

whereby said paging system performs a page to a called subscriber when the called subscriber cannot be reached via said public land mobile network and whereby an incoming call to said one of said plurality of mobile radio terminals is parked until the mobile radio terminal is manually switched on and registers with the home location register and the mobile services switching center parking the incoming call is informed of the activation of the mobile radio terminal and is provided with a roaming number; and whereby said mobile services switching center then calls the activated mobile radio terminal using a page over said public land mobile network and the mobile radio terminal answers the incoming call.

2. The system according to claim 1, wherein at least one pager contains at least one display screen.

3. The system according to claim 2, wherein said page includes a telephone number of the calling party which is displayed on said at least one display screen.

4. The system according to claim 3, wherein said incoming call is parked for up to a first limited predetermined period of time T1.

5. The system according to claim 4, wherein a second period of time T2 is stored in said pager and counted down on a display screen on said pager, wherein T2 is less than or equal to T1.

6. The system according to claim 5, wherein the telephone number of the calling party is kept stored in said pager until reset by a cancellation message from the mobile services switching center via said wide area paging system to said pager when an associated incoming call has been answered by the called party.

7. The system according to claim 5, wherein said second period of time T2 is sent to said pager during said page.

8. The system according to claim 1, wherein said home location register comprises a category storage means for flagging the identity of mobile radio terminals which have associated pagers.

9. The system according to claim 2, wherein said pager comprises:

means for storing telephone numbers of calling parties; and means for marking said stored telephone numbers to indicate which calls have been answered, wherein said pager receives a signal from said paging system indicating which stored telephone numbers should be marked.

10. A method for connecting a call from a first user with a first terminal to a second user with a second terminal said second terminal being of a cellular radio type in a communication system containing a cellular communication system and a paging system, wherein a pager is associated with but separate from said second terminal, comprising the steps of:

attempting a call from said first terminal to said second terminal;

routing the call to a mobile services switching center;

requesting a roaming number for said second terminal from a home location register;

indicating to said mobile services switching center that said second terminal cannot be reached and sending a special code which indicates that said second terminal has said pager associated with said second terminal and sending a first number to said mobile services switching center, said first number being the number of said pager;

sending a paging request to said paging system asking that said pager be paged using said first number;

sending said page to said pager;

when said second user receives said page, said second user manually activates said second terminal, wherein when said second terminal is activated, said second terminal registers with said home location register;

periodically requesting a roaming number of said second terminal from said home location register by said mobile services switching center;

sending said roaming number to said mobile services switching center in response to said periodic requests after said second terminal has registered with said home location register;

connecting said first and second terminals using said roaming number.

11. A method for connecting a call according to claim 10, further comprising the step of:

asking said first user to wait while said page is being performed.

12. A method for connecting a call according to claim 10, further comprising the step of:

starting a timeout timer when said mobile services switching center requests said page, wherein said mobile services switching center terminates said call if the second user does not respond to said page within a first specified period of time.

13. A method according to claim 10, wherein said pager comprises at least one display screen.

14. A method according to claim 13, wherein said page includes a telephone number of the calling party which is displayed on said at least one display screen.

15. A method according to claim 12, wherein a second specified period of time is counted down on a second display screen on said pager, the second specified period being shorter than the first specified period to allow time for paging.

16. A method according to claim 15, wherein said second specified period of time is stored in said pager and begins to count down when the page is received.

17. A method according to claim 10, wherein said second user enters a personal identification number when deactivating said second terminal rather than when activating said second terminal so as to speed up the registration process when switching on said second terminal.

18. A method according to claim 13, further comprising the steps of:

storing telephone numbers of calling parties in said pager;

marking stored telephone numbers of calls which have been answered, wherein said markings are displayed along with the telephone number on said at least one display screen.

19. A method for connecting a call from a first user with a first terminal to a second user with a second terminal said second terminal being of the cellular type in a communication system containing a cellular communication system and a paging system, wherein a pager is associated with but separate from said second terminal, comprising the steps of:

attempting a call from said first terminal to said second terminal;

routing the call to a mobile services switching center;

requesting a roaming number for said second terminal from a home location register;

indicating to said mobile services switching center that said second terminal cannot be reached and sending a special code which indicates that said second terminal has said pager associated with said second terminal and sending a first number to said mobile services switching center, said first number being the number of said pager;

sending a paging request to said paging system asking that said pager be paged using said first number;

sending said page to said pager;

when said second user receives said page, said second user manually activates said second terminal, wherein when said second terminal is activated, said second terminal registers with said home location register;

determining in said home location register whether a request has been stored within a first specified period of time for a roaming number of said second terminal;

sending said roaming number to said mobile services switching center if a request has been stored within said first specified period of time; and connecting said first and second terminals using said roaming number.

20. A method for connecting a call according to claim 19, further comprising the step of:

asking said first user to wait while said page is being performed.

21. A method for connecting a call according to claim 19, further comprising the step of:

starting a timeout timer when said mobile services switching center requests said page, wherein said mobile services switching center terminates said call if the second user does not respond to said page within a second specified period of time.

22. A method for connecting a call according to claim 19, wherein said second user enters a personal identification number when deactivating said second terminal rather than when activating said second terminal so as to speed up the registration process when switching on said second terminal.

23. A method according to claim 19, wherein said pager comprises at least one display screen.

24. A method according to claim 23, wherein said page includes a telephone number of the calling party which is displayed on said at least one display screen.

25. A method according to claim 21, wherein a third specified period of time is counted down on a display screen on said pager, the third specified period being shorter than the second specified period to allow time for the paging.

26. A method according to claim 25, wherein said third specified period of time is stored in said pager and begins to count down when the page is received.

27. A method according to claim 26, wherein said third specified period of time is sent to said pager during the page.

28. A method for connecting a call from a first user with a first terminal to a second user with a second terminal said second terminal being of the cellular type in a communication system containing a cellular communication system and a paging system, wherein a pager is associated with but separate from said second terminal, comprising the steps of:

attempting a call from said first terminal to said second terminal;

routing the call to a mobile services switching center;

requesting a roaming number for said second terminal from a home location register;

receiving said roaming number at said mobile services switching center along with a special code which indicates that said second terminal has said pager associated with said second terminal and also receiving a number for said pager;

setting up said call with said second terminal using said roaming number;

sending a paging request to said paging system asking that said pager be paged using said number for said pager when said call is not answered within a first predetermined period of time $T_a$ after the step of setting up said call;

sending said page to said pager;

completing connection of said call to said second terminal if said second user answers said second terminal within a second predetermined period of time $T_b$ after the page has been requested; and terminating said call if said second user does not answer said second terminal within said second predetermined period of time $T_b$.

29. A method for connecting a call according to claim 28, further comprising the step of:

asking said first user to wait while said page is being performed.

30. A method for connecting a call according to claim 28, wherein said second user enters a personal identification number when deactivating said second terminal rather than when activating said second terminal.

31. A method according to claim 28, wherein said pager comprises at least one display screen.

32. A method according to claim 31, wherein said page includes a telephone number of the first user which is displayed on said at least one display screen.

33. A method according to claim 28, wherein a third period of time $T_c$ is counted down on a display screen on said pager, wherein $T_c$ is less than or equal to $T_b$.

34. A method according to claim 28, wherein said third period of time $T_c$ is stored in said pager and begins to count down when the page is received.

35. A method according to claim 28, wherein said third period of time $T_c$ is sent to said pager during the page.

36. A mobile services switching center in a system comprising a cellular mobile radio system and a wide area paging system, said wide area paging system being used for alerting said called subscriber simultaneously with alerting via said cellular mobile radio system when said subscriber does not react within a first predetermined time period to alerting signals via said cellular mobile radio system in response to an originating call, said mobile services switching center comprising:

means for requesting and receiving a category of said called subscriber and a roaming number for setting up said connection to said called subscriber;

means for alerting said called subscriber via said cellular mobile radio system;

means for determining that said called subscriber has not responded within said first predetermined time period to paging signals via said cellular mobile radio system and that the subscriber is of a category K indicating that the subscriber may simultaneously be alerted via a separate pager associated with the subscriber's cellular mobile radio terminal;

means for parking said originating call and asking the calling subscriber to wait while performing a wide area page to said separate pager;

means for waiting in the mobile services switching center up to a second predetermined time period to give the called subscriber an opportunity to answer via said cellular mobile radio system; and means for setting up said connection via said cellular mobile radio system between the parked originating call and the called subscriber when the called subscriber answers to said wide area page by using said cellular mobile radio system.

37. A mobile services switching center in a system comprising a cellular mobile radio system and a wide area paging system, said wide area paging system used for alerting said called subscriber when said subscriber's cellular mobile radio terminal is in an off state, said mobile services switching center comprising:

means for requesting and receiving a category, an on-off status and if the on-status applies a roaming number for a called subscriber;

means for parking an originating call and asking the calling subscriber to wait while performing a wide area page for said called subscriber via said wide area paging system;

means for waiting in the mobile services switching center up to a specified time period to give the called subscriber an opportunity to manually switch on the called subscriber's cellular mobile radio terminal thereby registering and informing the said cellular mobile radio system of the subscriber's location;

means for setting up in a known way a connection via said cellular mobile radio system between the parked originating call and the called subscriber after a variable time period;

wherein said variable time period depends on the time the called subscriber waits before manually switching on the subscriber's cellular mobile radio terminal, thereby informing on the subscriber's location and thereby enabling the mobile services switching center to receive a roaming number and to set up said call and whereby the mobile services switching center does not set up a call if the called subscriber chooses not to switch on said cellular mobile radio terminal during said specified time period.

* * * * *